Figure 1:
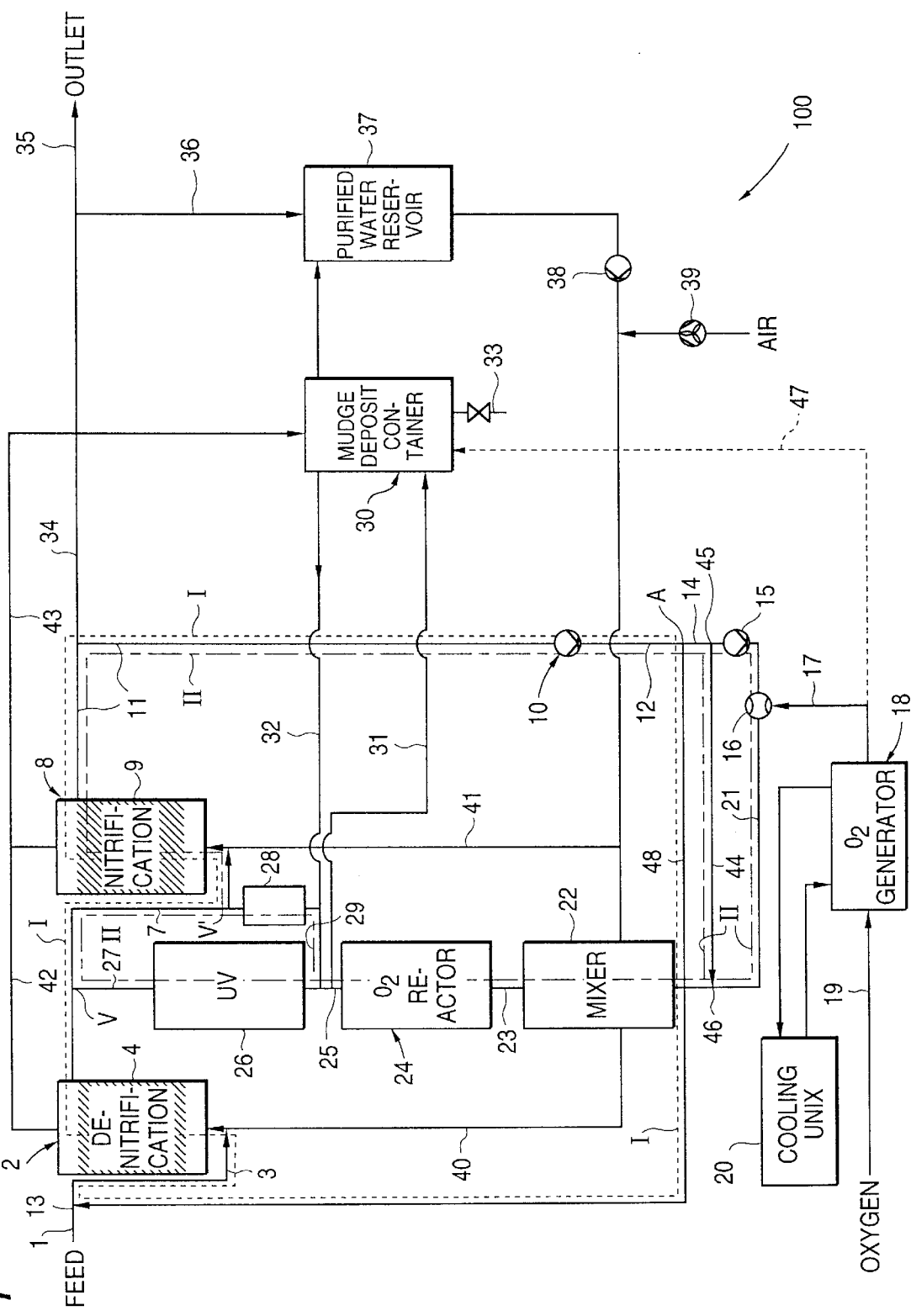

United States Patent [19]
Leitzke

[11] Patent Number: 5,851,399
[45] Date of Patent: Dec. 22, 1998

[54] PROCESS AND ARRANGEMENT FOR BIODEGRADING POLLUTANTS IN WATER

[75] Inventor: Ortwin Leitzke, Kaarst, Germany

[73] Assignee: Wedeco Umwelttechnologie Wasser-Boden-Luft GmbH, Herford, Germany

[21] Appl. No.: 809,367

[22] PCT Filed: Sep. 27, 1995

[86] PCT No.: PCT/DE95/01334

§ 371 Date: May 28, 1997

§ 102(e) Date: May 28, 1997

[87] PCT Pub. No.: WO96/09987

PCT Pub. Date: Apr. 4, 1996

[30] Foreign Application Priority Data

Sep. 29, 1994 [DE] Germany .......................... 44 34 753.7

[51] Int. Cl.$^6$ ................................ C02F 1/78; C02F 3/30; C02F 1/32
[52] U.S. Cl. .................... 210/605; 210/620; 210/627; 210/631; 210/192; 210/195.1; 210/205
[58] Field of Search .................................. 210/603–605, 210/620, 621, 627, 625, 630, 631, 748, 760, 192, 194, 195.1, 199, 200–202, 205, 207, 209, 218, 220, 243

[56] References Cited

U.S. PATENT DOCUMENTS

| | | | |
|---|---|---|---|
| 3,847,803 | 11/1974 | Fisk | 210/605 |
| 4,256,574 | 3/1981 | Bhargava | 210/195.1 |
| 4,824,563 | 4/1989 | Iwahori et al. | 210/605 |
| 5,240,600 | 8/1993 | Wang et al. | 210/631 |
| 5,645,725 | 7/1997 | Zitzelsberger et al. | 210/605 |

FOREIGN PATENT DOCUMENTS

| | | |
|---|---|---|
| 0 433 200 | 6/1991 | European Pat. Off. . |
| 0 438 073 | 7/1991 | European Pat. Off. . |
| 0 478 583 | 4/1992 | European Pat. Off. . |
| 0 645 347 | 3/1995 | European Pat. Off. . |
| 30 46 707 | 7/1982 | Germany . |
| 40 00 292 | 7/1991 | Germany . |
| 39 19 885 | 6/1994 | Germany . |
| 43 08 159 | 9/1994 | Germany . |

OTHER PUBLICATIONS

Patent Abstracts of Japan, vol. 950, No. 003, JP 7–080481, Mar. 1995.
Patent Abstracts of Japan, vol. 018, No. 371, JP 6–099188, Apr. 1994.
Patent Abstracts of Japan, vol. 950, No. 004, JP 7–088495, Apr. 1995.
Derwent Publications Ltd., Class D15, AN 95316272, JP 7–214093, Aug. 1995.
Chemical Patents Index, Derwent Publications, Ltd., Ref. No. 94–205360/25, JP 6–142695, Nov. 1992.
H. U. Baldes, "Aufbereitung von Deponiesickerwasser mit Ozon aus Sauerstoff", WLB Wasser, Luft und Boden, Apr. 1993, p. 54.
Lehr–und Handbuch der Abwassertechnik; 3 Aufl., Bd. IV, Verlag Ernst & Sohn, Berlin, 1985, p. 311.
Chemical Patent index, Derwent Publications, Ltd., Ref. No. 90–315580/42, JP 2–222798, Feb. 1989.

Primary Examiner—Thomas G. Wyse
Attorney, Agent, or Firm—Foley & Lardner

[57] ABSTRACT

The process serves for treating water polluted with pollutants which can only be degraded with difficulty by purely biological means. The water is circulated through a reactor vessel arrangement (24) in which it is treated with ozone which causes a preliminary oxidation of the pollutants. The water passes into a vessel arrangement 8 containing an aerobic biological treatment which, owing to the preliminary oxidation of the pollutants, is able to degrade these further. The water is conducted in a main circuit I and a part-circuit II branched off therefrom.

20 Claims, 1 Drawing Sheet

PROCESS AND ARRANGEMENT FOR BIODEGRADING POLLUTANTS IN WATER

The invention relates to a process according to the preamble of claim 1 and a corresponding plant according to the preamble of claim 10.

The invention relates to the treatment and disposal of water-borne pollutants which can be degraded only with difficulty, or not at all, in a purely biological manner, e.g. toxic substances in leachates from landfills or industrial effluent such as chlorinated hydrocarbons, dioxins, pesticides or dyestuffs.

It is customary to treat industrial effluent and landfill leachates of this type by a combination of biological treatment and ozonization, in order to achieve the legally prescribed values for introduction into a sewage outfall for COD (=chemical oxygen demand), $BOD_5$ (=biological oxygen demand), $AO_x$ (=absorbable organic halogenated hydrocarbons) and $NH_4$—N (=ammonium nitrogen). For this purpose, conventional unpressurized activated sludge biological treatments or pressurized vessel biological treatments using activated sludge or film biological treatments fixed on support materials are used. Attempts are made to oxidize completely, with ozone, the substances which are not biodegraded in these treatments to give biodegradable acids or carbon dioxide. An ozone treatment of this type which can be connected downstream of a biological treatment is subject matter of EP 478 583 B1.

In order to save energy, it is also known to give the nonbiodegraded substances only a preliminary cracking with ozone and then to feed them to a downstream biological step where a further biodegradation process takes place which can then deal with the preliminarily cracked substances which were not biodegraded in the first biological stage. Plants of this type are operated by the applicant in the harbors of Amsterdam and Rotterdam in order to treat industrial effluent in such a manner that they can be introduced into the sewage outfall.

The combinations of preliminary biological treatment, ozonization and downstream biological treatment in various vessels and stages gives rise to large overall dimensions. In addition, the circulating water streams for the upstream and downstream biological treatment and ozonization are circulated and operated separately. This also gives rise to high energy costs for the pumps. The biological treatments are customarily supplied with atmospheric oxygen, energy again being necessary to operate the gas introduction apparatus, i.e. the compressors. If the biological treatments are supplied with industrial-grade oxygen, it is also already known to react the industrial-grade oxygen in a separate system to generate the ozone required for the ozonization and then, that is to say when the ozone is no longer present, to use it for the biological treatment. However, in this case also, the oxygen which was not converted into ozone and not absorbed by the circulating water of the plant, is collected separately and resupplied to the ozone generator, as is given by, for example, EP 478 583, FIG. 3, for which purpose pump power and plant components are required.

The preambles of claims 1 and 10 are based on DE 40 00 292 A1, which relates to a process for purifying water which is polluted with poorly degradable compounds, using ozone, in which prepurified water is subjected to an ozonization at an ozone concentration such that only a preliminary oxidation of the poorly degradable compounds present in the water takes place, which compounds, as a result, becomes [sic] susceptible a [sic] biodegradation by microbiologically colonized activated carbon. An adequate efficiency of the ozonization requires in this case a complex multistage reaction vessel arrangement.

The object of the invention is to eliminate the disadvantages of the prior method which are high capital expenditure for vessels and equipment units and high energy expenditure for the water circuits to supply the biological treatment and the separate water circuits for the ozone introduction and ineffective oxygen utilization.

This object is achieved in its processing aspect by the invention given in claim 1.

A biological treatment and an ozone treatment are again combined here, in such a manner that ozone is utilized only to give a preliminary oxidation (preliminary cracking, conditioning) of the biodegradable substances so that they can be attacked biologically. A main circuit, in which the majority of the water under treatment circulates through the biological treatment, and a part-circuit, in which the ozone introduction and the ozone reaction takes [sic] place in a branched-off part-quantity of this water, are present. The ozone treated part-quantity of water is continuously transferred back into the main amount of water which is circulating in the main circuit and which is in part continuously subjected again to an ozonization. The extent of this treatment is decided according to the water pollution occurring in the individual case. Not only apparatus units but also oxygen gas are saved, since both are used simultaneously for a plurality of tasks, namely for the ozonization and the maintenance of the biological treatment. The large volume of the circulating water stream in relation to the gas volume stream and the continuously repeated action in the circuit achieves a high degree of ozone absorption and oxygen absorption and a correspondingly intensive degradation action.

An important development of the invention is subject matter of claim 2.

The two biological treatments of different character present according to this are continuously circulated through and act together to give a substantial reduction of the pollutants. The bacteria in the anaerobic biological treatment require $O_2$ and H. The $O_2$ is obtained by the bacteria from the nitrate present in the water, which nitrate is thus reduced to harmless $N_2$. The H originates from the COD in the water, to which additional H sources such as methanol or acetic acid can be added. $NH_4$ is oxidized in the aerobic biological treatment to nitrate which, together with the circulating water of the main circuit, passes back to the anaerobic biological treatment and is there reduced to $N_2$.

Care must be taken in the reintroduction of the ozone-treated water into the main circuit that no ozone passes into the biological treatment, because this would cause the death of the bacteria (claim 3).

The ozone can be kept away from the biological treatment in various manners.

According to claim 4, the amount of ozone can be measured in such a manner that the ozone is completely consumed in the preliminary oxidation of the pollutants in the reactor vessel arrangement and ozone is no longer present in the water leaving the reactor vessel arrangement.

However, it is also possible according to claim 5 to degrade ozone still remaining in the water after passing through the reactor vessel arrangement into oxygen-containing molecules or free radicals in a UV irradiation unit, which molecules or free radicals are no longer harmful for the biological treatment and can even effect a more intensive decomposition, e.g. of halogenated hydrocarbons.

A further alternative possibility for protecting the biological treatment from ozone is its catalytic destruction as claimed in claim 6.

It is also possible according to claim 7 to pass the circulating water, together with ozone still remaining after passing through the reactor vessel arrangement, into a sludge settling tank containing excess sludge from the biological treatment, in order to give the pollutants present therein a preliminary oxidation and to condition them for the further biodegradation.

An advantageous aspect of the invention is subject matter of claim 8.

Non-ozonized water containing pollutants can therefore be continuously added to the biological treatment vessel arrangement, so that the vessel arrangement for the aerobic biological treatment, in contrast to prior art, simultaneously combines the functions of an upstream biological treatment and a downstream biological treatment in that not only non-ozonized raw water, but also water which has already been biologically pretreated once and then ozonized is fed to it.

The feature of claim 9 is important in practice for restricting the complexity of the apparatus.

Claims 10 to 20 give the aspect of the invention in terms of apparatus in the form of a corresponding plant.

For an effective ozone treatment, not inconsiderable amounts of ozone are required, in particular when the treatment takes place in a flowing amount of liquid. To provide these amounts of ozone, an ozone generator having a silent discharge is suitable (claim 20), because the ozone amounts which can be produced therein are two orders of magnitude above those of other ozone generators.

When "water" is in question, this is also taken to mean aqueous liquids which can comprise defined proportions of other liquids, with the proviso that these do not interfere with the biological treatment.

The drawing shows a diagram of a plant according to the invention.

The plant, indicated as a whole by 100, has, as main component, a main circuit I having a vessel arrangement 2 containing an anaerobic biological treatment, and a part-circuit II which branches off from the main circuit I at the branching point A and comprises an apparatus 16 for introducing ozone-containing gas and a reaction vessel arrangement 24 in which the ozone reacts with the pollutants, and rejoins the main circuit I at a union point V or V', whereupon the two circuits pass together through a vessel arrangement 8 containing an aerobic biological treatment.

Water polluted with pollutants which are difficult to degrade biologically (NH, COD and $AO_x$) is fed into the main circuit I shown by a dashed line at the feed 1. It passes initially via the line 3 from the bottom into the vessel arrangement 2 containing an anaerobic biological treatment. The vessel arrangement 2 is shown only diagrammatically as a rectangle and can comprise one and a plurality of individual vessels. The vessel arrangement 2 is provided with a packing 4 of support bodies, e.g. clay balls, indicated by the cross-hatching, to which a biological lawn is fixed, i.e. an extended culture of bacteria which attacks the pollutants entrained in the water. In the vessel arrangement 2, in a low-oxygen atmosphere, a denitrification takes place in which the bacteria obtain the oxygen necessary for life from the constituents of the water, i.e. $NO_3$ present in the circulating water, which arrives in a manner still to be described in the line 40 and likewise enters the vessel arrangement 2, is reduced to $N_2$. Furthermore, the vessel arrangement 2 has a filtration action and also performs a certain biological reduction of COD by up to 50%.

The circulating water passes from the vessel arrangement 2 via the line 7 from the bottom into a vessel arrangement 8 containing an aerobic biological treatment, which likewise again can comprise one or more individual vessels and has a packing 9 of support bodies on which a biological lawn is fixed. A nitrification takes place. $NH_3$ present in the water is oxidized to $NO_3$ which, together with the circulating water conducted in the main circuit I, then passes via the lines 11 and 48 back into the vessel arrangement 2 and is reduced there to molecular nitrogen.

Although the biological treatments present in the illustrative example in the vessel arrangements 2 and 8 are described as fixed-bed biological treatments, they could also be sludge biological treatments.

The water from the vessel arrangement 8 passes via the line 11 to a pump arrangement 10 which effects the recirculation and, as mentioned, returns a proportion of the water exiting from the vessel arrangement 8 via the return line 48 in the main circuit I branching off at 14 from the pump outlet line 12, to the feed 1, where it combines at 13 with the raw water just fed in and together with this is introduced into the vessel arrangement 2 via the line 3.

The pump arrangement 10, which is depicted as a single pump, but can also comprise a plurality of pumps arranged at different points, only generates a pressure which is sufficient to recirculate the water and to overcome the hydraulic resistances. Pressure vessels are thus never required.

At the branch-off point A downstream of the pump arrangement 10, there branches off from the main circuit I (dashed) in the line 14 a part-circuit II which is emphasized by a dash-dotted line.

The majority of the water branched off into the part-circuit II is conducted via the line 14 and the main line 44 which branches off at the connection point 45 and belongs to the part-circuit II. At the connection point 45 of the lines 12 and 44 downstream of the pump arrangement 10, some of the water is branched off from the circuit in a line 21 and, via a pump 15, is brought to a slightly elevated pressure up to about 4 bar. The water then passes through a feed apparatus 16 in the form of an injector in which ozone-containing gas is injected into it from an ozone generator 18 via the line 17. The feed apparatus 16 need not necessarily be an injector. If the ozone generator 18 operates at a sufficiently high pressure of, for example, 2 bar, the ozone-containing gas can also be introduced at a simple connection.

The part of the circuit containing the pump 15, the injector 16 and the line 21, in which, therefore, the ozone is admixed and which rejoins, at the point 46, the line 55 parallel thereto, likewise belongs to the partcircuit II.

If the pump arrangement 10 conveys, for example, 100 m³/h, about 80 m³/h for example could flow via the line 44, and about 20 m/h [sic] via the line 21. The proportion of water returned via the line 12 to the vessel arrangement 2 containing the anaerobic biological treatment is relatively lower.

The ozone generator 18 produces the ozone from an oxygen-containing gas, generally technical-grade oxygen which is supplied to the ozone generator 18 via the line 19. The ozone generator 18 operates with a silent electrical discharge. Heat produced in the course of this is removed by a refrigeration unit 20 by a cooling circuit.

In the ozone generator 18, the oxygen supplied is not quantitatively converted into ozone, but an ozone-containing gas is formed which, apart from ozone, still contains the unconverted oxygen. This ozone-containing gas is admixed to the water in the injector 16 and passes together with the water via the line 21 to the point 46, where the mixture joins the main amount flowing in the main line 44 which then enters into a mixer 22 in which gas and water are intensively mixed in order to promote the absorption of the ozone and the oxygen in the water. The water thus treated, which contains the oxygen and ozone partly in absorbed form and partly in the form of gas bubbles which must not be removed, enters via the line 23 into a closed reactor vessel arrangement 24 in which the reactions, in particular, of the ozone with the pollutants in the water, take place at moderately elevated temperatures of about 20°–40° C. The reactor vessel arrangement 24 which is only shown diagrammatically as a rectangle can comprise a single vessel or a plurality of vessels and is described in detail in FIG. 1 of EP 478 583 B1.

The pollutants which can be degraded with difficulty or not at all in a purely biological manner in the water are given a preliminary oxidation or conditioning in the reactor vessel arrangement 24 under the action of ozone just to the extent that they are then exposed to the attack by the aerobic biological treatment in the vessel arrangement 8 and can there be further degraded. The ozone treatment in the reactor vessel arrangement 24 therefore only needs to make the pollutants in the water ripe for attack for the subsequent bacterial attack in the vessel arrangement 8, but need not necessarily itself induce a complete degradation of the pollutants. However, without the preliminary oxidation in the reactor vessel arrangement 24, a bacterial treatment in the vessel arrangement 8 would be without effect.

The bacteria cultures present in the vessel arrangement 8 are, as living creatures, sensitive to ozone. Therefore, the water exiting in the line 25 at the reactor vessel arrangement 24 and introduced into the vessel arrangement 8 must be prevented from still containing ozone.

For this purpose, three measures are indicated diagrammatically in the diagram which can be used as alternatives, or else together.

The first measure is a UV irradiation device 26 downstream of the reactor vessel arrangement 24 in the part-circuit II, through which UV irradiation device the water is passed and in which the ozone, under intensive UV action, is decomposed into oxygen-containing molecules or free radicals which no longer damage the biological treatment in the vessel arrangement 8 when the water reenters the main circuit I at the union point V via the line 27, by passing the water into the feed line 7 to the vessel arrangement 8.

It is also possible to pass the water exiting from the reactor vessel arrangement 24 in the line 25 through a catalyst unit 28 via a line 29, which catalyst unit destroys the ozone. The line 29 containing the catalyst unit 28 belongs in this case to the part-circuit II which in this case rejoins the main circuit I at the union point V', ozone-free water being fed into the line 7 at the union point V'.

A further possibility is to introduce water exiting in the line 25, if it still contains residual ozone, into a sludge settling tank 30 via the line 31, which sludge settling tank 30 contains the excess sludge from the vessel arrangements 2 and 8. The residual ozone in the water fed via the line 31 acts here for the purpose of degrading the pollutants and is consumed in this. Water returned via the line 32 and introduced into the vessel arrangement 8 therefore no longer contains ozone and can no longer endanger the biological treatment in the vessel arrangement 8.

When the sludge present in the sludge settling tank 30 is completely reacted, it can be removed from the sludge settling tank 30 via a take-off device 33. By means of the dashed line 47, it is indicated that ozone-containing gas can also be supplied to the sludge settling tank 30 directly from the ozone generator 18.

In the vessel arrangement 8 in which the nitrification proceeds, in addition, the residual COD contents are degraded. Furthermore, there is a reduction in $AO_x$, because the corresponding pollutants have been given a preliminary cracking in the ozone treatment and have been made biologically available.

Treated water exits from the vessel arrangement 8 via the lines 11 and 34 and passes via the outflow 35 into the sewage outfall. Some of this water is branched off via a line 36 and fed to a clarified water storage 37. The water of this storage is recirculated via a pump 38 and aerated via a fan 39. The aerated water passes via the lines 40 and 41 to the vessel arrangements 2 and 8. The atmospheric oxygen can additionally serve to supply the biological treatments.

From time to time, the pump 38 is switched on or increased in power, as a result of which excess sludge formed in the vessel arrangements 2 and 8 after the bacterial reaction is washed over into the sludge settling tank 30 via the line 42, 43. In this manner, the reaction products of the bacterial activity are repeatedly removed batchwise as excess sludge and eliminated from the circuit.

I claim:

1. A method for degrading pollutants in polluted water which can only be degraded with difficulty or not at all by purely biological means, wherein an ozone-containing gas is generated from oxygen-containing gas and admixed with the flowing water, and wherein the ozone introduced into the water at least preliminarily oxidizes the pollutants present in the water, wherein said method comprises continuously passing the water through at least one biological treatment in a main circuit, comprising a continuous feed for polluted water and a device for removing solids formed in the biological treatment, wherein a portion of the stream of biologically-treated water is continuously separated from the main circuit into a branched-off part-circuit which rejoins the main circuit at a union point; and wherein ozone-containing gas is continuously admixed with the biologically-treated water in said part-circuit.

2. A method according to claim 1, wherein said polluted water upstream of the union point (V, V') in the direction of passes through an anaerobic biological treatment at a point upstream of said union point and subsequently passes through an aerobic biological treatment downstream of said union point.

3. A method according to claim 2, wherein said polluted water is in a substantially ozone-free state when it reaches said union point.

4. A method according to claim 3, wherein residual ozone is substantially completely consumed in the oxidation reaction with the pollutants.

5. A method according to claim 3, wherein residual ozone is degraded by UV irradiation upstream of said union point.

6. A method according to claim 3, wherein residual ozone is catalytically degraded upstream of said union point.

7. A method according to claim 3, wherein residual ozone is passed into a sludge settling tank containing excess sludge from the biological treatment upstream of said union point.

8. A method according to claim 2, wherein non-ozonized polluted water is continuously added to the aerobic biological treatment at the same time as the ozonized water.

9. A method according to claim 1, wherein said at least one biological treatment is performed substantially at atmospheric pressure.

10. A plant for carrying out the method according to claim 1, comprising a main circuit, into which polluted water, containing pollutants which can only be degraded with difficulty or not at all by purely biological means, is fed and recirculated, said main circuit comprising a feed point, at least one biological treatment unit, a union point upstream of said at least one biological treatment unit, one or more pumps and a device for removing solids formed in the biological treatment, all in fluid connection with one another, and b) a part-circuit which is connected to and branches from said main circuit downstream of said at least one biological treatment unit, and which comprises an inlet, through which ozone-containing gas is continously introduced into said polluted water, and at least one reaction vessel, in fluid communication with one another.

11. A plant according to claim 10, wherein said main circuit comprises an anaerobic biological treatment unit upstream of said union point and an aerobic biological treatment unit downstream of said union point.

12. A plant according to claim 11, wherein means are provided which ensure that the water of the part-circuit enters into the main circuit at the union point in a substantially ozone-free state.

13. A plant according to claim 12 wherein said means comprise a metering device for the ozone introduced at the inlet.

14. A plant according to claim 12 wherein said means comprise a UV irradiation unit upstream of said at least one biological treatment unit.

15. A plant according to claim 12 wherein said means comprise a catalyst unit upstream of said at least one biological treatment unit.

16. A plant according to claim 12 comprising a sludge settling tank into which excess sludge from said at least one biological treatment unit can be flushed, further into which gas leaving said at least one reaction vessel and still containing residual ozone can be introduced, and which has a device for taking off completely reacted sludge.

17. A Plant according to claim 16, wherein ozone-containing gas from the ozone generator can also be introduced directly into the sludge settling tank.

18. A plant according to claim 10 comprising a back-washing device by means of which, treated water is used to intermittently wash sludge from the said at least one biological treatment unit into a sludge settling tank.

19. A plant according to claim 18, comprising a fan by means of which air can be admixed to the said treated water.

20. A plant according to claim 10, comprising an ozone generator which operates with a silent discharge.

* * * * *